United States Patent [19]

Okisu et al.

[11] Patent Number: 5,093,562

[45] Date of Patent: Mar. 3, 1992

[54] FOCUS DETECTING APPARATUS WITH IMPROVED PRECISION IN DETECTING PHASE DIFFERENCE

[75] Inventors: Noriyuki Okisu; Hiroshi Ueda; Toshio Norita; Tokuji Ishida; Nobuyuki Taniguchi, all of Osaka, Japan

[73] Assignee: Minolta Camera Kabushiki Kaisha, Osaka, Japan

[21] Appl. No.: 666,694

[22] Filed: Mar. 8, 1991

Related U.S. Application Data

[63] Continuation of Ser. No. 480,618, Feb. 15, 1990.

[30] Foreign Application Priority Data

Feb. 17, 1989 [JP] Japan .................... 1-39086

[51] Int. Cl.$^5$ .............................. G01J 1/20
[52] U.S. Cl. ....................... 250/201.8; 354/408
[58] Field of Search ............. 250/201.7, 201.8, 204; 354/408

[56] References Cited

U.S. PATENT DOCUMENTS 4,572,476 2/1986 Oinoue .......................... 250/201.8
4,912,497 3/1990 Nishibe ........................ 250/201.8

Primary Examiner—David C. Nelms
Assistant Examiner—K. Shami
Attorney, Agent, or Firm—Burns, Doane, Swecker & Mathis

[57] ABSTRACT

The focus detecting apparatus of the present invention is adapted to detect focusing state of a taking lens by detecting relative positional relation between first and second images formed by luminous bundles from an object which passed through first and second image re-forming lenses, including first series of photosensitive elements receiving the first image, second series of photosensitive elements receiving the second image, first calculating device related to a plurality of portions of the series of elements each having a prescribed number of elements on the first series of photosensitive elements, for calculating a representative value for each portion, a second calculating device related to a plurality of portions of the series of elements each having a prescribed number of elements on the second series of photosensitive elements, for calculating a representative value for each portion correlation calculating device for calculating correlation between representative values of the portions of the series of elements on the first series of photosensitive elements and the representative values of each of the plurality of groups provided by dividing the portions of the series of elements on the second series of photosensitive elements, specifying device for specifying a group having highest correlation out of the correlation; and detecting device for detecting relative positional relation between the portions of the series of elements on the first series of photosensitive elements and the specified groups.

16 Claims, 14 Drawing Sheets

BASE PORTION

REFERENCE PORTION 0  1  2  3  4  5  6  7  8  9 10

1  2  3  4  5  6  7  8  9

FOCUS DETECTING APPARATUS WITH IMPROVED PRECISION IN DETECTING PHASE DIFFERENCE

This application is a continuation of application Ser. No. 480,618, filed Feb. 15, 1990.

BACKGROUND OF THE INVENTION

1. Field of the Invention

The present invention relates to a focus detecting apparatus, and more specifically, to an improvement of a correlation calculating algorithm in a focus detecting apparatus using TTL (Through The Lens) phase difference detecting method.

2. Description of the Related Art

A focus detecting apparatus using a so-called TTL phase difference detecting method such as disclosed in U.S. Pat. No. 4,636,624 has been known, in which a condenser lens and first and second image re-forming lenses are provided behind a predetermined focal plane of a taking lens, and an amount of defocus, which corresponds to a difference amount between an image formed by the taking lens and the predetermined focal plane, is detected as an amount of displacement of a distance between first and second images re-formed by the first and second image re-forming lenses.

FIG. 1 is a schematic diagram showing the above mentioned conventional apparatus. Referring to the figure, the focus detecting apparatus comprises a taking lens TL, a film equivalent plane F, a condenser lens CL, image re-forming lenses $L_1$ and $L_2$, an aperture mask M limiting light incidental to the image re-forming lenses $L_1$ and $L_2$, apertures $M_1$ and $M_2$ of the aperture mask M and charge storing type image sensors $I_1$ and $I_2$. An image in the range between the points A and B on the film equivalent plane F are re-formed as an image in the range between the points $A_1$ and $B_1$ and an image in the range between the points $A_2$ and $B_2$, respectively, on the image sensors $I_1$ and $I_2$ by means of the condenser lens CL and the image re-forming lenses $L_1$ and $L_2$. The image sensors $I_1$ and $I_2$ output two image signals corresponding to intensity distribution of the two images formed thereon to a correlation calculating circuit 1, and the distance between the two images formed on the image sensors $I_1$ and $I_2$ are determined in the correlation calculating circuit 1, since the image signals have a certain correlation.

FIG. 2 shows, in detail, a focus detecting optical system in the above described focus detecting apparatus. If the object is in-focus and a point image C is present on the film equivalent plane F, point images $C_1$ and $C_2$ are formed on the image sensors $I_1$ and $I_2$. The distance between the point images at this time is represented as $S_0$. When the object is in front focus and a point image D is present in front of the film equivalent plane F, point images $D_1$ and $D_2$ are formed on the image sensors $I_1$ and $I_2$. The distance between the point images at this time is smaller than $S_0$. If the object is in rear focus and a point image E is present behind the film equivalent plane F, point images $E_1$ and $E_2$ are formed on the image sensors $I_1$ and $I_2$. The distance between the point images at this time is larger than $S_0$. In this manner, when we represent the distance between images in the in-focus state by $S_0$, the distance between images in the front focus state is smaller than $S_0$, and the distance between images in the rear focus state is larger than $S_0$. The distance between images is approximately proportional to the defocus amount. Therefore, the in-focus/out-of-focus state can be determined by detecting the distance between images, and if the object is out of focus, the amount and direction of defocus can be detected.

Now, if there are three point images A, B and C on the film equivalent plane F, the optical paths for forming point images $C_1$ and $C_2$ from the point image C on the optical axis are symmetrical about the optical axis $l_0$. However, the optical paths for forming point images $A_1$ and $A_2$ based on the point image A out of the optical axis (the optical paths for forming point images $B_1$ and $B_2$ from the point image B) are asymmetrical about the optical axis $l_0$. Therefore, brightness and size of the point images $A_1$ and $A_2$ and $B_1$ and $B_2$, respectively, may not the same, even if the optical system for focus detection is manufactured in perfect symmetry about the optical axis $l_0$. In this manner, as the height of image (hereinafter referred to as an "image height") from the optical axis $l_0$ is increased, there will be less and less coincidence between the brightness and size of the two images generated from the same point image. Consequently, the brightness distributions of the two images on the image sensors $I_1$ and $I_2$ are not always symmetrical. Consequently, the distance between images determined by the correlation calculating circuit 1 becomes inaccurate, causing an error in focus detection. This is called an image height error.

As to the point images C, D and E on the optical axis, there will be no image height error generated. However, if the optical system for focus detection is formed not perfectly symmetrically, for example, when the area or shape of a pair of openings $M_1$ and $M_2$ of the aperture mask M is different from each other, the brightness or size of the two images formed based on the same point image does not coincide with each other, which also causes error in focus detection.

In view of the foregoing, various methods for evaluating correlation between the two images as exactly as possible to determine the distance between images accurately even in such cases have been proposed. For example, Japanese Patent Laying-Open No. 61-103114 discloses a correlation calculating method. In accordance with this method, one center of light intensity distribution (hereinafter referred to as a light intensity center) is calculated for the entire optical image on the image sensor $I_1$ serving as a base portion, a light intensity center is calculated in each of a plurality of partial regions of the optical image on the image sensor $I_2$ serving as a reference portion (with each partial region assumed to be of the same length as the base portion), the light intensity center of each partial region in the reference portion is compared with the light intensity center of the base portion, and when the light intensity center of one partial region coincides with the light intensity center of the base portion, it is determined that the partial region corresponds to the base portion. However, in this method, when the intensity centers of two or more partial regions in the reference portion coincide with the light intensity center of the base portion, which of the partial regions in the reference portion corresponds to the base portion can not be determined.

Further, since it is assumed that each of the partial region is of the same length as the base portion, it can not be assumed that the brightness distribution in that region is substantially flat. Therefore, influence of the brightness distribution when the light intensity center of a partial region near the base portion is calculated is different from that in calculating the light intensity center of a partial region distant from the base portion. Consequently, errors in focus detection derived from asymmetry of the brightness distribution can not be avoided.

SUMMARY OF THE INVENTION

An object of the present invention is to improve precision in detection in a focus detecting apparatus using TTL phase difference detecting method.

Another object of the present invention is to reduce influence of brightness distributions of two images whose phases are to be calculated, in a focus detection apparatus using TTL phase difference detecting method.

A further object of the present invention is to reduce influence of errors in manufacturing optical system for forming two images whose phases are to be calculated, in a focus detecting apparatus using TTL phase difference detecting method.

A still further object of the present invention is to reduce influence of asymmetry of brightness distributions of two images whose phases are to be calculated, in a focus detecting apparatus using TTL phase difference detecting method.

The above described objects of the present invention can be attained by a focus detecting apparatus in accordance with the present invention adapted to detect relative positional relation between first and second images formed by luminous bundles from an object passed through first and second portions of a taking lens further passing first and second image re-forming lenses to detect focus state of the taking lens, comprising: a first series of photosensitive elements receiving the first image; a second series of photosensitive element receiving the second image; first calculating means related to a plurality of portions of the series of elements each consisted of a prescribed number of elements on the first series of photosensitive elements, for calculating a representative value of each of the portions of the series of elements based on the light intensity received by that portion of the series of elements; a second calculating means related to a plurality of portions of the series of elements each consisted of a prescribed number of elements on the second series of photosensitive elements, for calculating a representative value of each of the portions of the series of elements based on the light intensity received by that portion of the series of elements; correlation calculating means for dividing the portions of the series of elements on the second series of photosensitive elements into a plurality of groups having the same number of portions of the series of elements as that of the portions of the series of elements on the first series of photosensitive elements for calculating correlation between representative values of each group and the representative values of the portions of the series of elements on the first series of photosensitive elements; specifying means for specifying a group having highest correlation calculated by the correlation calculating means; and detecting means for detecting relative positional relation between the portion of the series of elements on the first series of photosensitive element and the group specified by the specifying means.

In the focus detecting apparatus structured as described above, even if the optical systems for forming the first and second images are asymmetrical, the influence of the asymmetry on the error in focus detection can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3A:
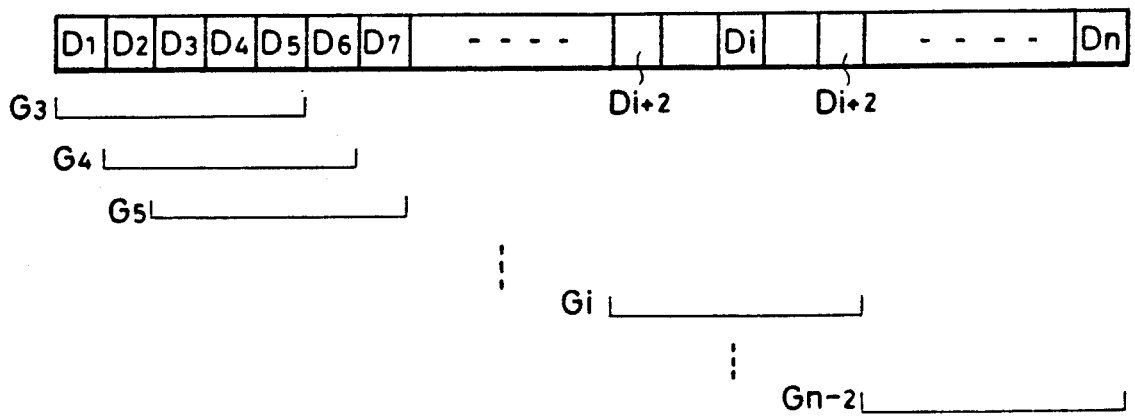
FIG. 3A is a schematic diagram illustrating formation of center data based on a plurality of light intensities from pixel signals in accordance with one embodiment of the present invention.
Figure 3B:
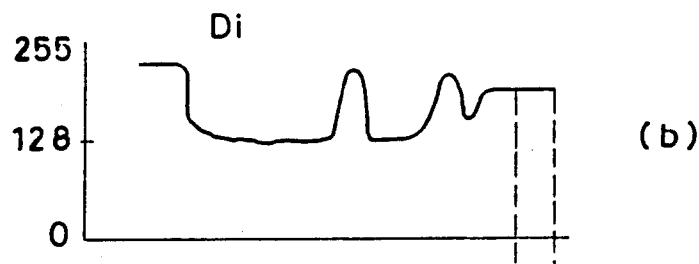
FIG. 3B is a diagram showing distribution of pixel signal data of FIG. 3A.
Figure 3C:
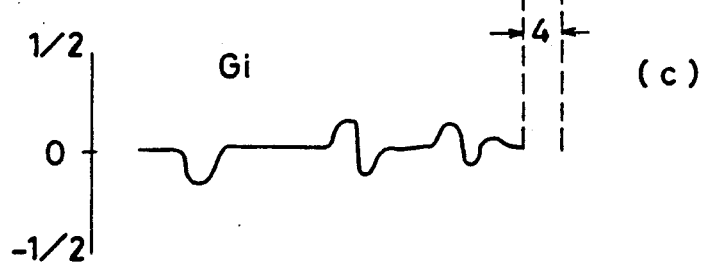
FIG. 3C is a diagram of distribution of light intensity center data provided from the pixel signal data of FIG. 3B.

In the present invention, data $G_3$ to $G_{n-2}$ indicative of centers of functional values (for example, centers of the light intensity distribution themselves, i.e. the light intensity centers) based on a plurality (for example (N−4)) of light intensities are formed for a small number of (for example adjacent 5) pixel signals $D_1$ to $D_5$, $D_2$ to $D_6$, $D_3$ to $D_7$..., $D_{n-4}$ to $D_n$ out of n pixel signals $D_1$ to $D_n$, as shown in FIG. 3A. Consequently, data of the pixel signals $D_1$ to $D_n$ as shown in FIG. 3B are converted into data of the light intensity centers $G_3$ to $G_{n-2}$ as shown in FIG. 3C. In the present invention, such data conversion is carried out on the base portion and the reference portion, respectively. The data indicative of the centers may be determined by using contrast values of light intensities.

Now, assuming that the base portion outputs n pixel signals $D_{11}$ to $D_{1n}$ and the reference portion outputs m (m >n) pixel signals $D_{21}$ to $D_{2m}$, (n−4) centers $G_{13}$ to $G_{1(n-2)}$ and (m−4) centers $G_{23}$ to $G_{2(m-2)}$ provided by the data conversion shown in FIGS. 3A to 3C are the data substantially free from the influence of brightness distribution, since each of the data is calculated for a small number of pixel signals. Therefore, by calculating correlation between the centers $G_{13}$ to $G_{1(n-2)}$ in the base portion and the centers $G_{2(3+S)}$ to $G_{2(n-2+S)}$ in the reference portion for a plurality of scan positions s=0 to (m−n), and by detecting, when the highest correlation is found at a specific scan position s, the distance between the centers $G_{13}$ to $G_{1(n-2)}$ of the base portion and centers $G_{2(3+s)}$ to $G_{2(n-2+s)}$ at that scan position s as the space between two images, the space between two images can be accurately evaluated, free from the influence of the brightness distribution.

The plurality of centers calculated in the base portion and the reference portion, respectively, are substantially free from the influence of the brightness distribution, since all of these centers are calculated based on a small number (for example, locally adjacent 5) pixel signals. In the range of locally adjacent small number of pixel signals, the brightness distribution can be assumed to be substantially flat. Therefore, no matter where the center is calculated in the base portion or the reference portion, the data of the center is free from the influence of the brightness distribution.

The details of the structure and function of the present invention will be more apparent from the following description of the embodiments.

Figure 2:
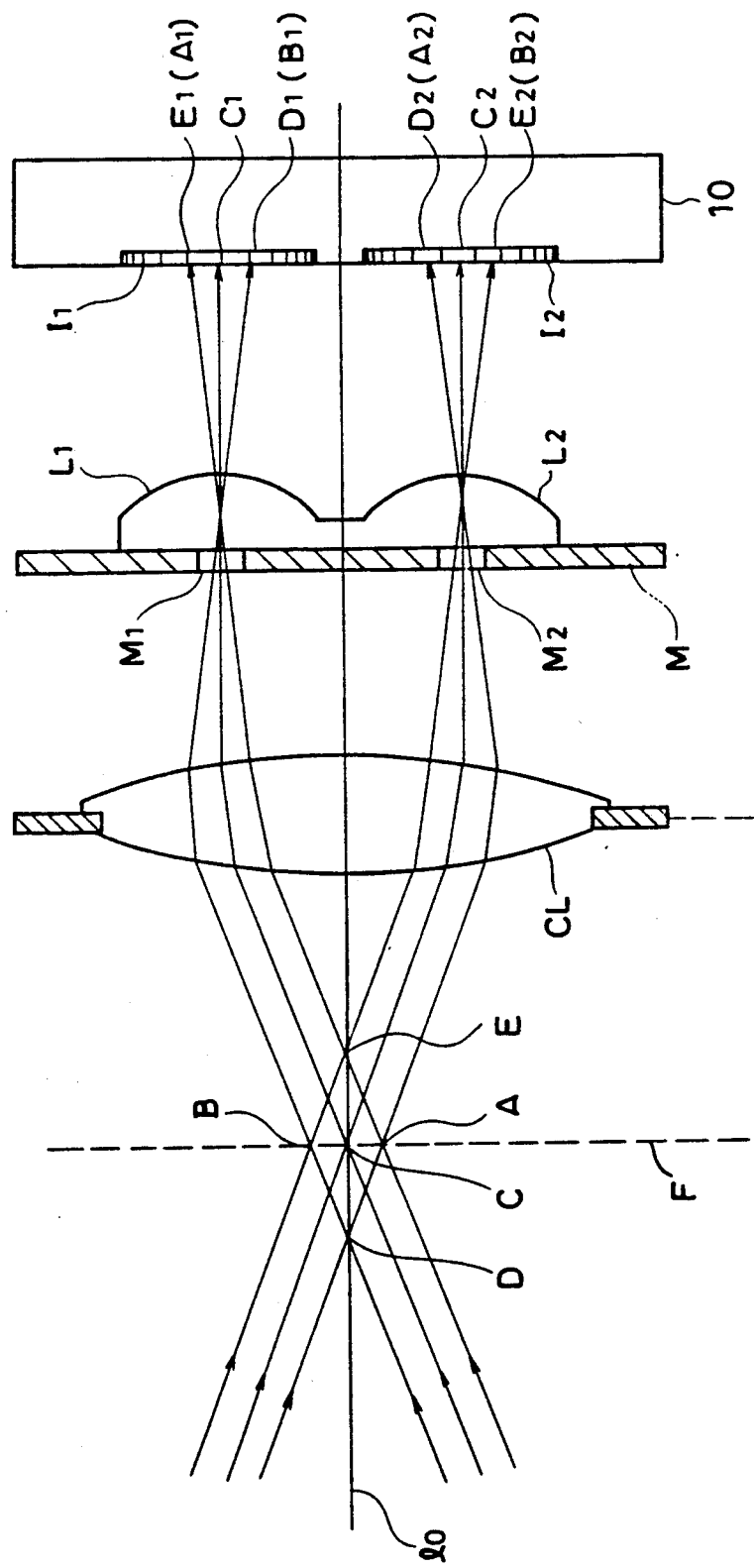
FIG. 2 is a detailed diagram of a focus detecting optical system in the focus detecting apparatus shown in FIG. 1.
Figure 4:
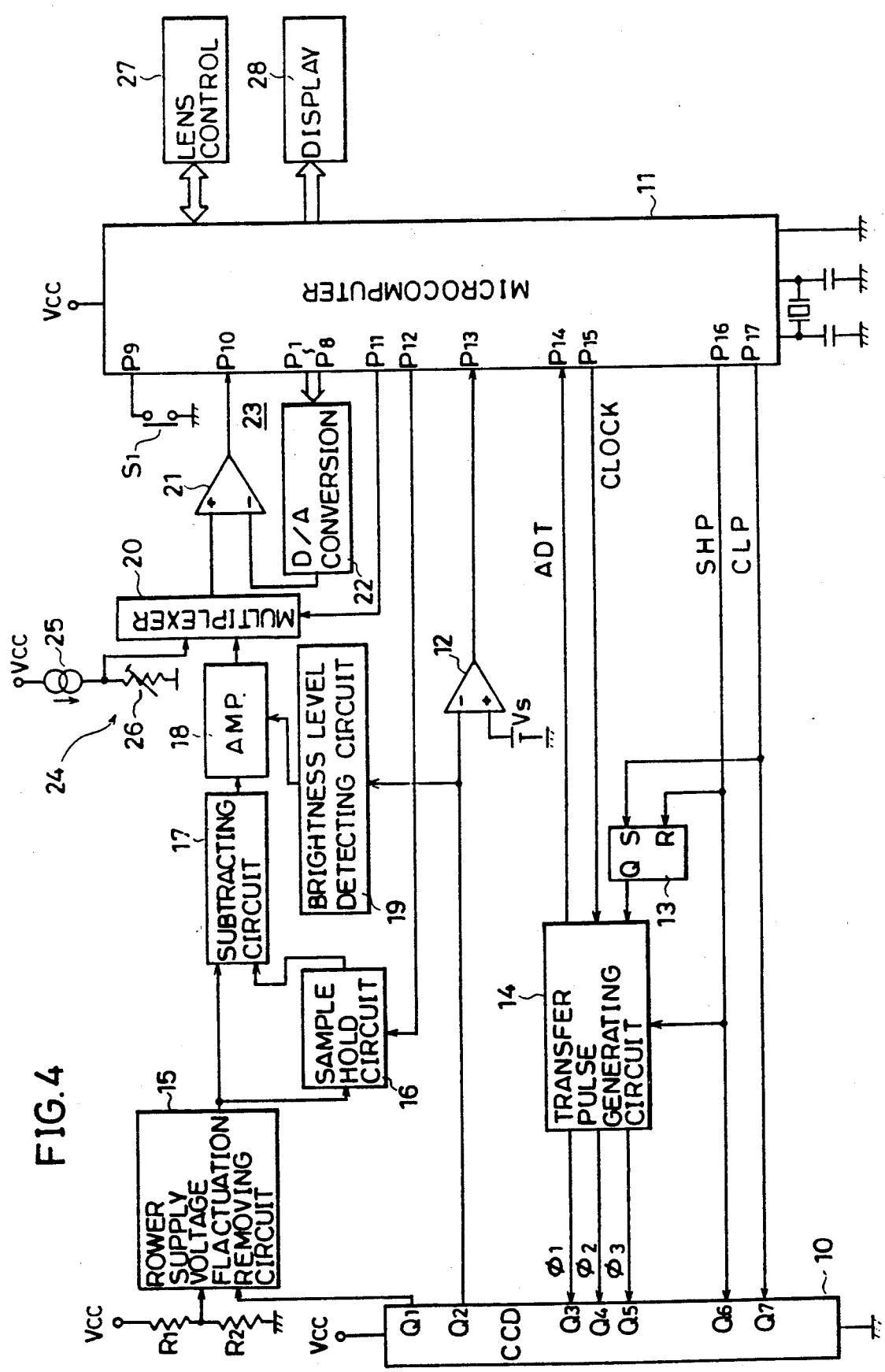
FIG. 4 is a schematic diagram of a correlation calculating circuit in the focus detecting apparatus in accordance with one embodiment of the present invention.

FIG. 4 is a schematic diagram of a correlation calculating circuit 1 used in a focus detecting apparatus in accordance with one embodiment of the present invention. In this embodiment, the above described image sensors $I_1$ and $I_2$ are implemented in a CCD line sensor 10, and the correlation calculating circuit 1 is formed by a microcomputer 11. The optical system shown in FIGS. 2 and 3 are employed as the optical system for focus detection. The CCD line sensor 10 has a plurality of pixels arranged in a line, and a transfer line for reading charges stored in each of the pixels. Dummy pixels having no charge are positioned at the head of the series of pixels, followed by black reference pixels having light intercepting masks formed by aluminum vapor deposition. Pixels of the image sensor $I_1$ serving as the basic portion are positioned little spaced apart from the black reference pixels, and pixels for the image sensor $I_2$ serving as the reference portion are positioned little spaced apart from the pixels of the image sensor $I_1$. Consequently, when a transfer pulse is inputted to the CCD line sensor 10, signals from the dummy pixels are outputted at first, thereafter signals are outputted from the black reference pixels, the signals from the pixels for the image sensor $I_1$ as the base portion are outputted, and finally, signals from the pixels of the image sensor $I_2$ are outputted.

In focus detection, when a focus detection instructing switch S1 is closed, a terminal $P_9$ of the microcomputer 11 is set to the "low" level, and in response thereto, the microcomputer 11 carries out a program for initializing the CCD line sensor 10. Before the start of focus detection, unnecessary charges are stored to be higher than the normal pixel signal level in the transfer lines and in the pixels of the CD line sensor. The unnecessary charges are cleared from the transfer line and from the pixels before taking out pixel signals. The clearing operation is the initialization of the CCD line sensor 10.

When the initialization is completed, the microcomputer 11 precedes to the execution of a focus detecting program. First, the microcomputer 11 outputs a clear pulse CLP from a terminal $P_{17}$. Charges stored in all the pixels of the CCD line sensor are cleared by the clear pulse CLP, and the time when generation of the clear pulse CLP is stopped becomes the start point of accumulation. As the accumulation is started, a lowering voltage, with the rate of lowering dependent on the brightness of an object, is outputted from an object brightness monitoring terminal $Q_2$ of the CCD line sensor 10. This voltage is compared with a constant voltage $V_s$ by a comparing circuit 12. When this voltage reaches $V_s$, the output signal from the comparing circuit 12 is inverted from the "low" level to the "high" level. This "high" level signal is inputted to an interruption terminal $P_{13}$ of the microcomputer 11, as an interruption signal indicative of the completion of charge accumulation. When the interruption is accepted, the microcomputer 11 outputs a shift pulse SHP from a terminal $P_{16}$. In response to the shift pulse SHP, the charges stored in each of the pixels of the CCD line sensor 10 are shifted to the transfer line in parallel, and thereafter serially transferred to be successively outputted as voltage signals from an analog signal output terminal $Q_1$. In the CCD line sensor 10, the time period from the application of the clear pulse CLP to the terminal $Q_7$ to the application of the shift pulse SHP to the terminal $Q_6$ is the time for charge accumulation. The CCD line sensor 10 receives three phase pulses $\phi_1$, $\phi_2$ and $\phi_3$ from a transfer pulse generating circuit 14, and the transfer line therein is always kept in a data transfer state. Accordingly, when the shift pulse SHP is applied to the CCD line sensor 10, the line sensor output the dummy pixel signals first, the black reference pixel signals, and thereafter pixel signals of the image sensors $I_1$ and $I_2$, from the analog signal output terminal $Q_1$.

When the potential of the power supply voltage $V_{cc}$ fluctuates, the fluctuation is superimposed on the analog signal outputs from the CCD line sensor 10, so that the analog signal outputs are inputted to a voltage fluctuation removing circuit 15 in order to offset and remove the fluctuation. The voltage fluctuation removing circuit 15 receives voltages provided by dividing the power supply voltage $V_{cc}$ by resistances $R_1$ and $R_2$, respectively, and outputs a voltage corresponding to difference between the two inputs. One of the black reference pixel signals outputted prior to the pixel signals from the image sensors $I_1$ and $I_2$ is sampled and held by a sample hold circuit 16 in response to a timing pulse outputted from a terminal $P_{12}$ of the microcomputer 11. The black reference pixel signal of the sample hold circuit 16 is subtracted by a subtracting circuit 17 from the following pixel signals. In this manner, the pixel signals are deprived of the voltage fluctuation component and the black reference output component.

The pixel signals from the subtracting circuit 17 are amplified by an amplifying circuit 18 based on the rate of amplification dependent on the brightness level detected by the brightness level detecting circuit 19. Rate of amplification is controlled to be higher as the brightness level is lower. The brightness level is detected as change in a prescribed time period of the lowering voltage by the brightness level detecting circuit 19 by using the lowering voltage outputted from the object brightness monitoring terminal $Q_2$ of the CCD line sensor 10. The change is used as a signal indicative of the brightness level. The amplified pixel signals are applied to a digitizing circuit 23 through a multiplexer 20.

The digitizing circuit 23 is formed of an A/D converting circuit carrying out successive comparison, comprising a voltage comparing circuit 21, a D/A converting circuit 22 and a microcomputer 11 programmed to apply 8 bits of binary number to the D/A converting circuit 22 through terminals $P_1$ to $P_8$ and to store the result of comparison inputted from a terminal $P_{10}$. The digitized pixel signals are stored in a RAM contained in the microcomputer 11. The timing of A/D conversion is controlled by a timing pulse ADT applied from the transfer pulse generating circuit 14 to the terminal $P_{14}$.

If all of the pixel signals have been taken, the microcomputer 11 temporarily outputs a "high" level voltage signal from a terminal $P_{11}$, and in response, a multiplexer 20 selects and outputs a constant voltage from a constant voltage circuit 24. The constant voltage is digitized by the digitizing circuit 23 to be stored in a prescribed memory. Since the distance between two images formed on the base portion and the reference portion in the in-focus state is not always the same as the designed value due to error during manufacturing of the optical system for focus detection, the digitized data is used as a data for compensating the error. The constant voltage circuit 24 is formed of a constant current circuit 25 and a semifixed resistance 26. In adjusting the focus detecting apparatus, accurate data of the space between images are set by adjusting the semifixed resistance 26.

Thereafter, data processing as will be described later is carried out to detect amount and direction of defocus of the taking lens, automatic focus adjustment control of the taking lens is carried out, and the state of focusing is displayed. A lens controlling circuit 27 drives the taking lens to the in focus position in response to a signal indicative of the amount and direction of defocus. A displaying circuit 28 displays in-focus/out-of-focus state.

At the initialization of the CCD line sensor 10, clock pulses having shorter period (for example 1/16 of the normal period) than that of normal pixel signal transfer are applied to the CCD line sensor 10 to repeatedly carry out several (for example 10) transfer operations faster than the normal operation to make the transfer line empty. Charges in the pixels are cleared in parallel thereto. In that case, taking of pixel signals is not carried out.

The transfer pulse generating circuit 14 generates transfer pulses $\phi_1$, $\phi_2$ and $\phi_3$ by dividing clock pulses CLOCK having a prescribed period applied from a terminal $P_{15}$ of the microcomputer 11. The transfer pulses having shorter period than normal are generated by changing the rate of division of the clock pulses CLOCK in the transfer pulse generating circuit 14, when a flipflop 13 is at a set state with the output thereof being "high" level. The flipflop 13 is set by a clear pulse CLP from the terminal $P_{17}$ of the microcomputer 11 and is reset by a shift pulse SHP from the terminal $P_{16}$. Namely, the transfer pulse generating circuit 14 is set in a state to generate the normal transfer pulse by the shift pulse SHP. As described in the foregoing, the time from the generation of the clear pulse CLP to the generation of the shift pulse SHP is defined as the time of charge accumulation in the CCD line sensor 10. During this period of charge accumulation, transfer pulses having shorter period than normal are outputted from the transfer pulse generating circuit 14. However, since the signals outputted through the transfer line from the CCD line sensor 10 during charge accumulation are treated unnecessary signals, there will be no problem even when the transfer pulses are made faster.

Data processing on the pixel signals from the image sensors $I_1$ and $I_2$ taken in the microcomputer 11 will be described. In this embodiment, a plurality of centers of functional values based on the light intensity, for example a plurality of light intensity centers are calculated from the pixel signals $D_{11}$ to $D_{1n}$ from the image sensor $I_1$ serving as the base portion, and a plurality of light intensity centers are also calculated from the pixel signals $D_{21}$ to $D_{2m}$ of the image sensor $I_2$ serving as the reference portion, and the latter light intensity centers are compared shifting one pixel by one pixel, with the former light intensity centers. For this purpose, the number of pixels m of the image sensor $I_2$ as the reference portion is set to be larger than the number of pixels n of the image sensor $I_1$ serving as the base portion.

The light intensity center is a data provided by dividing a sum of product of a distance from a pixel at the center of a group of a small number adjacent pixels to each of pixels in the group and the level of each pixel signal by the total sum of the levels of the pixel signals in the group. For example, the light intensity centers $G_i$ of $(2h+1)$ pixel signals $D_{(i-h)}$, $D_{(i-h+1)}$, ..., $D_i$, ..., $D_{(i+h-1)}$, and $D_{(i+h)}$ immediately preceding and succeeding a pixel signal Di is represented by the following equation.

$$G_i = \frac{\sum_{k=-h}^{h} \{k \times D_{i+k}\}}{\sum_{k=-h}^{h} \{D_{i+k}\}}$$

In this embodiment, light intensity centers of adjacent five signals are used for correlation calculation. The light intensity centers $G_i$ of five pixel signals $D_{i-2}$, $D_{i-1}$, $D_i$, $D_{i+1}$ and $D_{i+2}$ directly preceding and succeeding the pixel signal Di is provided in accordance with the following equation.

$$G_i = \{-2 \times D_{i-2} - 1 \times D_{i-1} + 0 \times D_i + 1 \times D_{i+1} + 2 \times D_{i+2}\}/\{D_{i-2} + D_{i-1} + D_i + D_{i+1} + D_{i+2}\} \ldots (*)$$

The content of the data processing in the present invention will be briefly described in the following, with the light intensity center $G_i$ provided in accordance with the above equation (*).

(1) First, light intensity centers $G_{13}$ to $G_{1(n-2)}$ are calculated for (n−4) pixel data $D_{11}$ to $D_{15}$, $D_{12}$ to $D_{16}$, $D_{13}$ to $D_{17}$, ..., $D_{1(n-4)}$ to $D_{1n}$ taken out of the pixels $D_{11}$ to $D_{1n}$ of the image sensor $I_1$.

(2) Thereafter, light intensity centers $G_{23}$ to $G_{2(m-2)}$ are calculated for (m−4) pixel data $D_{21}$ to $D_{25}$, $D_{22}$ to $D_{26}$, $D_{23}$ to $D_{27}$, ..., $D_{2(m-4)}$ to $D_{2m}$ taken out from the pixels $D_{21}$ to $D_{2m}$ of the image sensor $I_2$.

(3) The light intensity centers $G_{23}$ to $G_{2(n-2)}$ are compared with the light intensity centers $G_{13}$ to $G_{1(n-2)}$ at first, and then the light intensity centers $G_{24}$ to $G_{2(n-1)}$ are compared with the light intensity centers $G_{13}$ to $G_{1(n-2)}$ by shifting one pixel. Thereafter, the light intensity centers $G_{2(3+s)}$ to $G_{2(n-2+s)}$ of the reference portion are compared with the light intensity centers $G_{13}$ to $G_{1(n-2)}$ of the base portion, shifting one pixel by one pixel, and finally the light intensity centers $G_{2(m-n+3)}$ to $G_{2(m-2)}$ are compared with the light intensity centers $G_{13}$ to $G_{1(n-2)}$. In the foregoing, s=0 to (m−n).

(4) Correlation is calculated based on the results of comparison. When there is a highest correlation between the sth light intensity centers $G_{2(3+s)}$ to $G_{2(n-2+s)}$ of the reference portion and the light intensity centers $G_{13}$ to $G_{1(n-2)}$ of the base portion, it is determined that the pixels $D_{11}$ to $D_{1n}$ of the basic portion corresponds to the pixels $D_{2(1+s)}$ to $D_{(n+s)}$ of the reference portion. Whether the object is in focus or out of focus is determined based on the space between the pixels, and if it is out of focus, the amount and direction of defocus are calculated. In this embodiment, the amount of defocus is calculated by the pitch of each pixel. Interpolating calculation may be carried out, if it is necessary to improve accuracy in calculating the amount of defocus (Such an interprolating calculation is disclosed in U.S. Pat. No. 4,636,624, for example).

Now, the pixel signals $D_{11}$ to $D_{1n}$ and $D_{21}$ to $D_{2m}$ of the image sensors $I_1$ and $I_2$ of the base portion and the reference portion, respectively, are stored pixel by pixel as 8 bits of data in the RAM contained in the microcomputer 11. The 8 bits of data can have the values from 0 to 255. If the level of the pixel signals are relatively high, the resolution is high enough for accurately carrying out calculation of the light intensity center $G_i$. However, if the level of the pixel signals are relatively low, the calculation of the light intensity center $G_i$ can not be always carried out with high precision. Therefore, in the present invention, the accuracy in calculating the light intensity center $G_i$ is improved by applying a prescribed offset to the pixel signal $D_i$. In the following, (i) effect of improving accuracy by the offset, (ii) method for determining offset, (iii) method of calculating light intensity center and (iv) method for determining resolution of light intensity center will be described.

(i) Effect of improving accuracy by the offset

Figure 5A:
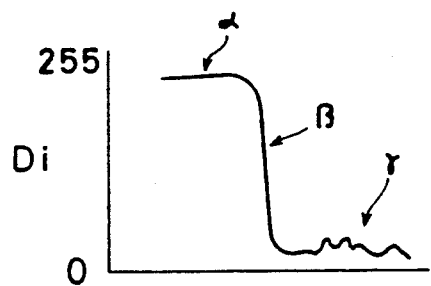
FIG. 5A shows one example of distribution of pixel signals in one embodiment of the present invention.
Figure 5B:
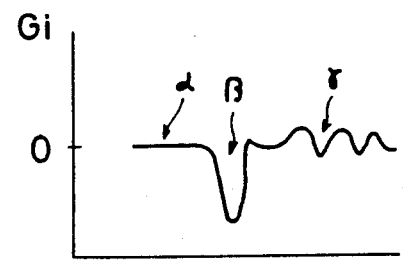
FIG. 5B shows light intensity centers calculated from the pixel signals of FIG. 5A.

For example, as to the pixel signal $D_i$ such as shown in FIG. 5A, light intensity center $G_i$ is calculated for every five adjacent pixels. Consequently, the light intensity center $G_i$ such as shown in FIG. 5B is calculated. In the regions $\alpha$ and $\beta$ were the level of the pixel signal $D_i$ is relatively high, the accuracy in calculating the light intensity center $G_i$ is high, so that significant data can be provided. However, in the region $\gamma$ where the level of the pixel signal $D_i$ is relatively low, the accuracy in calculating the light intensity center $G_i$ is low, so that ineffective data influence by the noise at low brightness only can be provided. For example, in the region $\beta$ inclined downward to the right in FIG. 5A, the levels of adjacent five pixel signals $D_{i-2}$ to $D_{i+2}$ are assumed to be 250, 230, 120, 60 and 30, for example, the light intensity center will be $G_i = (-2 \times 250 - 1 \times 230 + 0 \times 120 + 1 \times 60 + 2 \times 30)/(250 + 230 + 120 + 60 + 30) = -0.884,$ in accordance with the above described equation (*). In view of the fact that the full range of the pixel signal is 0 to 255, the data is calculated based on valid pixel signals derived from the contrast of the object, so that the accuracy in calculation can be regarded as relatively high. However, in the region $\gamma$ where the signal level is low in FIG. 5A, when levels of adjacent five pixel signals $D_{i-2}$ to $D_{i+2}$ are assumed to be 4, 4, 3, 2, 2, respectively, the light intensity center will be $G_i = (-2 \times 4 - 1 \times 4 + 0 \times 3 + 1 \times 2 + 2 \times 2)/(4 + 3 + 2 + 2) = -0.4;$ in accordance with the above equation (*). Since the full range of the pixel signal is 0 to 255, the data seems to be calculated based on ineffective pixel signals derived from dark noise not related to the contrast of the object, so that the accuracy in calculation is very low. In such cases, it is not preferred to compare the former light intensity center with the latter light intensity center, regarding both as the data having approximately the same accuracy. Meanwhile, in the region $\alpha$ with high level in FIG. 5A, assuming that the levels of adjacent five pixel signals $D_{i-2}$ to $D_{i+2}$ are 254, 254, 253, 252 and 252, the light intensity center will be $G_i = (-2 \times 254 - 1 \times 254 + 0 \times 253 + 1 \times 252 + 2 \times 252)/(254 + 254 + 253 + 252 + 252) = 0.$ Namely, even if the level fluctuation is the same, the light intensity center $G_i$ fluctuates much in the region $\gamma$ where the pixel signal $D_{i-2}$ to $D_{i+2}$ are of low level, while the light intensity center $G_i$ hardly fluctuates in the region $\alpha$ where the pixel signals $D_{i-2}$ to $D_{i+2}$ are at a high level.

Figure 6A:
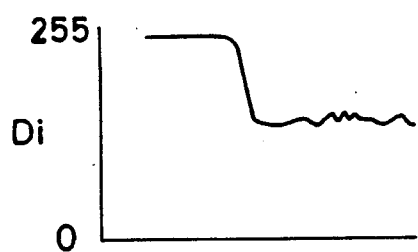
FIG. 6A shows distribution of pixel signals provided by compressing levels of the pixel signals of FIG. 5A and by applying offset thereto.
Figure 6B:
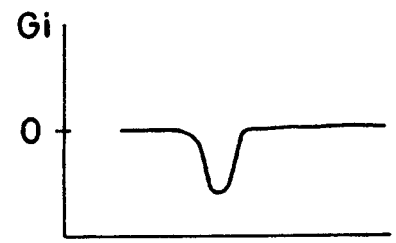
FIG. 6B shows light intensity centers calculated from the pixel signals of FIG. 6A.

Therefore, in the present embodiment, the influence of the dark noise is removed by applying offset such that the minimum value of the pixel signal $D_i$ become ½ of the full range, that is, 128. Referring to FIG. 5A, when the level of the pixel signal $D_i$ is compressed to ½ and an offset is applied so that the minimum value will be 128, a pixel signal $D_i$ such as shown in FIG. 6A is provided. The light intensity center $G_i$ of the pixel signal $D_i$ is calculated to be as shown in FIG. 6B. It can be seen that the influence of dark noise in the region $\gamma$ where the pixel signal $D_i$ is of low level is removed.

(ii) Method for determining the offset

Figure 7A:
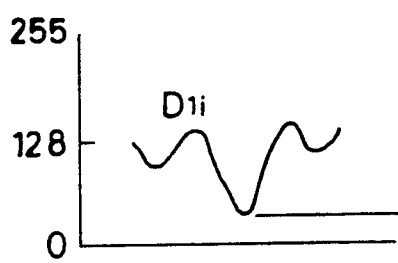
FIG. 7A shows distribution of pixel signals in a base portion of one object for describing the method of determining offset in accordance with one embodiment of the present invention.
Figure 7B:
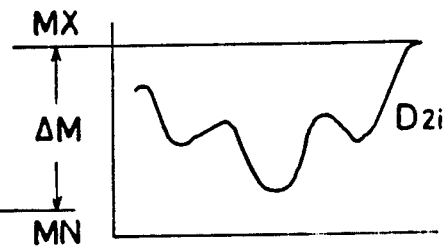
FIG. 7B shows distribution of pixel signals in a reference portion of one object for describing the method of determining offset in accordance with one embodiment of the present invention.
Figure 8A:
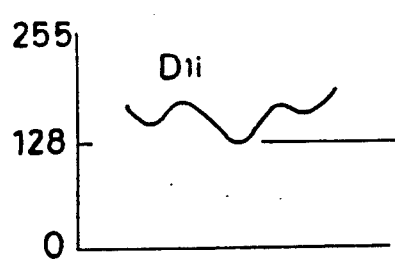
FIG. 8A shows distribution of pixel signals in a base portion of another object for describing the method of determining offset in accordance with one embodiment of the present invention.
Figure 8B:
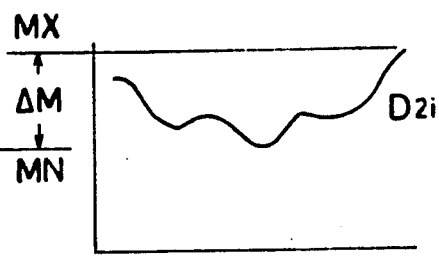
FIG. 8B is a diagram showing distribution of pixel signals in a reference portion of another object for describing the method of determining offset in accordance with one embodiment of the present invention.

A method of determining the offset will be described with reference to FIGS. 7A, 7B, 8A and 8B. FIGS. 7A and 7B show a pixel signal $D_{1i}$ in the base portion and a pixel signal $D_{2i}$ in the reference portion of an object, respectively. FIGS. 8A and 8B show a pixel signal $D_{1i}$ of the base portion and a pixel signal $D_{2i}$ of the reference portion of another object, respectively. In both cases, at first a difference $\Delta M = (MX - MN)$ between the maximum value MX and the minimum value MN of the pixel signals $D_{1i}$ and $D_{2i}$ is calculated to determine the offset.

(a) When $\Delta M \geq 128$

When the difference M is not less than 128 as shown in FIGS. 7A and 7B, the maximum value MX exceeds 255 when the minimum value MN of the pixel signals $D_{1i}$ and $D_{2i}$ is set to be 128. Therefore, in this case, all the pixel signals $D_{1i}$ and $D_{2i}$ are compressed to $\frac{1}{2}$ as described with reference to FIGS. 5A and 6A, and thereafter, an offset of $(128 - MN/2)$ is applied to all the pixel signals $D_{1i}$ and $D_{2i}$. Namely, conversion as represented by the following equation is carried out on the pixel signal $D_i$ in general.

$$D_i \leftarrow (\tfrac{1}{2})D_i + (128 - MN/2)$$

The 8 bit pixel signal $D_i$ can be made $\frac{1}{2}$ easily, by shifting respective bit values once to the right.

(b) when $\Delta M < 128$

Meanwhile, if the difference $\Delta M$ is smaller than 128 as shown in FIGS. 8A and 8B, the maximum value MX does not exceed 255, when the minimum value MN of the pixel signals $D_{1i}$ and $D_{2i}$ is set to be 128. Therefore, in this case, an offset of $(128 - MN)$ is applied to all the pixel signals $D_{1i}$ and $D_{2i}$. Namely, the conversion represented by the following equation is carried out on the pixel signals $D_i$, in general.

$$D_i \leftarrow D + (128 - MN)$$

By converting the pixel signals $D_{1i}$ and $D_{2i}$ in the above described manner, the minimum value of the pixel signal $D_i$ becomes 128, and the maximum value does not exceed 255.

(iii) Method of calculating light intensity center

The offset pixel signal is again represented by $D_i$. As shown in FIG. 3A, the light intensity center $G_3$ is calculated in accordance with the equation (*) for adjacent five pixel signals $D_1$, $D_2$, $D_3$, $D_4$ and $D_5$ out of n pixel signals $D_1$, $D_2$, $D_3$, $D_4$, $D_5$, $D_6$, $D_7$, ..., $D_i$, ..., $D_n$; a light intensity center $G_4$ is calculated in accordance with the equation (*) for the adjacent five pixel signals $D_2$, $D_3$, $D_4$, $D_5$ and $D_6$; and a light intensity center $G_5$ is calculated in accordance with the equation (*) for the adjacent five pixel signals $D_3$, $D_4$, $D_5$, $D_6$ and $D_7$. In the same manner, the light intensity center $G_i$ is calculated in accordance with the equation (*) for adjacent five pixel signals $D_{i-2}$, $D_{i-1}$, $D_{i+1}$ and $D_{i+2}$ preceding and succeeding a pixel signal $D_i$, and finally, the light intensity center $G_{n-2}$ is calculated in accordance with the equation (*) for the adjacent five pixel signals $D_{n-4}$, $D_{n-3}$, $D_{n-2}$, $D_{n-1}$ and $D_n$ preceding and succeeding the pixel signal $D_{n-2}$. Thus (n−4) light intensity centers $G_3$ to $G_{n-2}$ in total are calculated. Now, since the pixel signal $D_i$ take a value in the range of 128 to 255 as shown in FIG. 3B, the light intensity center $G_i$ takes a value in the range of −0.426 to +0.426, as shown in FIG. 3C. Namely, when adjacent five pixel signals are 255, 255, 128, 128, and 128, respectively, the light intensity center $G_i$ takes the minimum value −0.426, and when the adjacent five pixel signals are 128, 128, 128, 255 and 255, the light intensity center $G_i$ takes the maximum value +0.426.

(iv) Method of determining resolution of light intensity center.

The light intensity center $G_i$ described above is provided as 2 bytes (16 bits $b_{15}$ to $b_0$) of data. Now, it is assumed that the upper 7 bits $b_{15}$ to $b_9$ represents the integral part, while the lower 9 bits $b_8$ to $b_0$ represent decimal part. Since the light intensity center $G_i$ takes a value in the range of −0.426 to +0.426 and is in the range of $\pm(\tfrac{1}{2})$ as described in the foregoing, the most significant bit $b_8$ of the decimal part corresponds to the sign bit, and the upper 7 bits $b_{15}$ to $b_9$ are unnecessary. Therefore, only the eighth to the first bits $b_9$ to $b_1$ are transferred to a 1-byte register, and in the succeeding data processing, the light intensity center $G_i$ is treated as 1 byte of data, whereby comparison (that is, calculation of correlation) between the light intensity centers in the base part and the reference part can be is discarded.

Figure 9A:
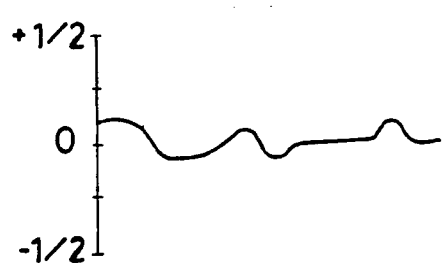
FIG. 9A is a diagram showing distribution of light intensity centers of one object for illustrating a method of determining resolution of light intensity centers in accordance with one embodiment of the present invention.
Figure 9B:
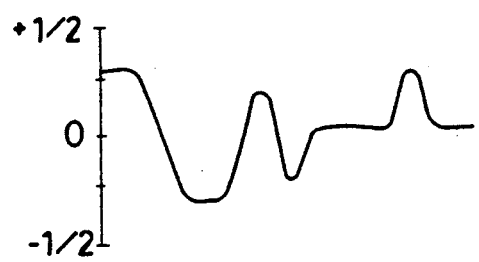
FIG. 9B is a diagram showing distribution of light intensity centers of the same object of FIG. 9A calculated at resolution different from that of FIG. 9A.

In some cases, all the light intensity centers $G_i$ of the base portion and the reference portion are in the range of $\pm(\tfrac{1}{4})$ as shown in FIG. 9A, dependent on the object. In such a case, the seventh bit $b_7$ also becomes a sign bit, and the upper 8 bits $b_{15}$ to $b_8$ become unnecessary. Therefore, when the eighth to the first bits $b_8$ to $b_1$ are treated as the data of the light intensity center $G_i$ as described above, the resolution of the light intensity center $G_i$ is decreased. Therefore, in such a case, not the least significant bit $b_0$ but the eighth bit $b_8$ is discarded, and the lower 1 byte (the seventh to the 0th bits $b_7$ to $b_0$) are treated as the light intensity center $G_i$. Consequently, the light intensity center $G_i$ becomes as shown in FIG. 9B, with the resolution improved twice that of the process described above.

Figure 10:
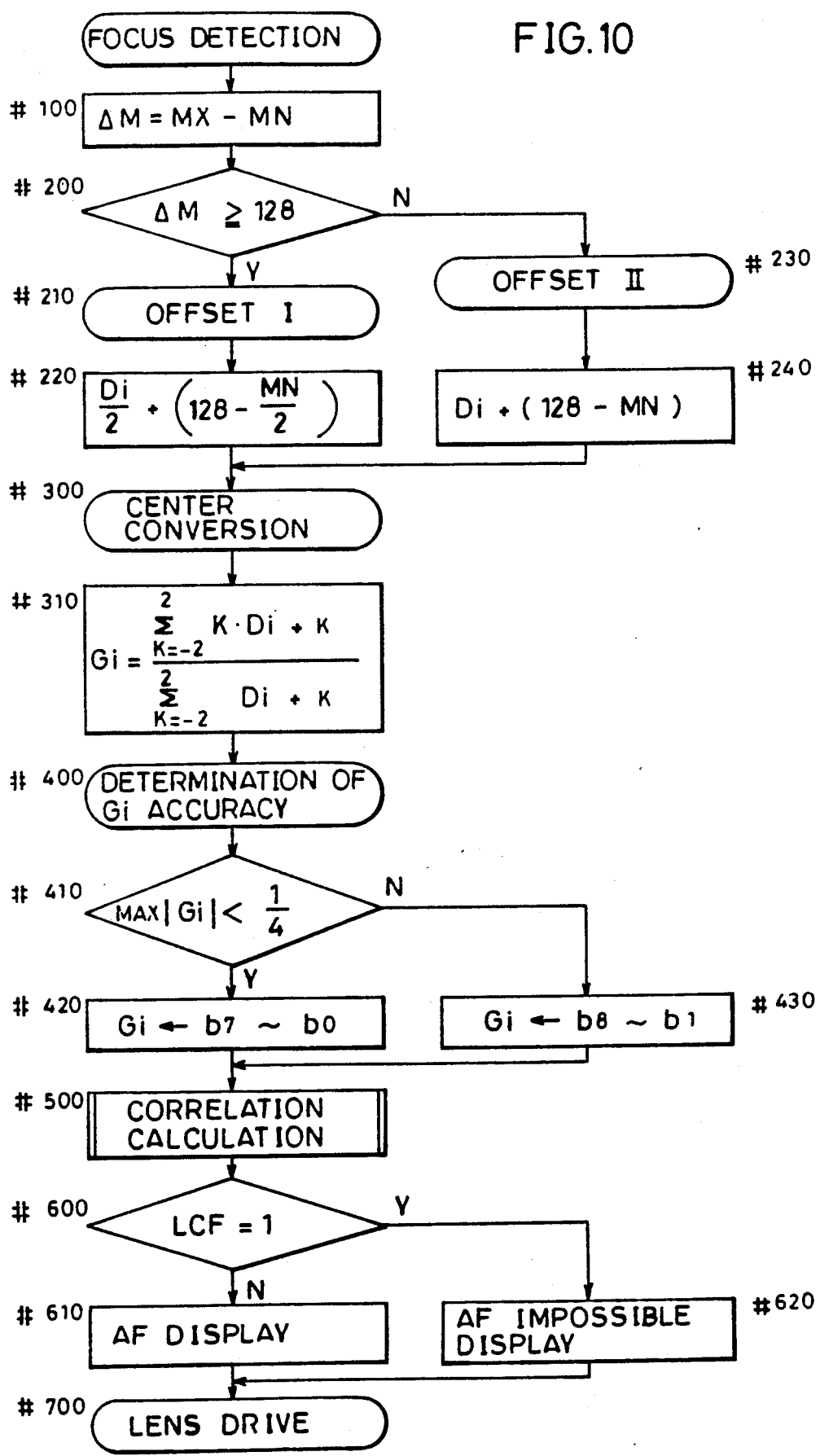
FIG. 10 is a flow chart showing a focus detecting program in accordance with one embodiment of the present invention.

A flow chart for realizing the above described data processing is shown in FIG. 10, and the contents of the data processing will be described.

When the pixel signals $D_{1i}$ and $D_{2i}$ are taken to the microcomputer 11, the microcomputer 11 executes the process shown in FIG. 10. First, in the step #100, the maximum value MX and the minimum value MN are calculated for the pixel signals $D_{1i}$ and $D_{2i}$, to calculate the difference $\Delta M = MX - MN$. In the step #200, whether or not the difference $\Delta M$ is not less than 128 is determined. If $\Delta M \geq 128$, then the program proceeds to the process of offset I in the step #210, and in the step #220, conversion of "$D_i \leftarrow D_i/2 + (128 - MN/2)$" is carried out. If M<128, the program proceeds to the process of offset II in the step #230, and in the step #240, conversion of "$D_i \leftarrow D_i + (128 - MN)$" is carried out. The program proceeds from the step #220 or #240 to the center intensity center $G_i$ is calculated in accordance with the above described equation (*) in the step #310. By this calculation, (n−4) light intensity centers $G_{13}$, $G_{14}$, $G_{15}$, ..., $G_{1(n-2)}$ are provided for n pixel signals $D_{1i}$ of the base portion, and (m−4) light intensity center $G_{23}$, $G_{24}$, $G_{25}$ ..., $G_{2(m-2)}$ are provided for m pixel signals $D_{2i}$ of the reference portion. Thereafter, the program proceeds to the process of determining accuracy of the light intensity center $G_i$ of the step

400. In the step #410, whether or not all the intensity centers $G_{13}, G_{14}, G_{15} \ldots, G_{1(n-20)}$ and $G_{23}, G_{24}, G_{25} \ldots, G_{2(m-2)}$ exceed the range of $\pm(\frac{1}{4})$ is determined. If all the light intensity centers $G_i$ do not exceed the range of $\pm(\frac{1}{4})$, the program proceeds to the step #420, in which the lower 8 bits $b_7$ to $b_0$ of the light intensity center $G_i$ calculated as 2 bytes of data are newly treated as 1 byte data of the light intensity center $G_i$. If any of the light intensity centers $G_i$ exceeds the range of $\pm(\frac{1}{4})$, the program proceeds to the step #430, in which the eighth to the first bits $b_8$ ti $b_1$ of the light intensity center $G_i$ calculated as 2 bytes of data are newly treated as 1 byte of light intensity center $G_i$. The program proceeds from the step #420 or #430 to the step #500 in which a subroutine of correlation calculation (see FIG. 11) is executed. This subroutine will be described later. As a result of correlation calculation, the amount of defocus DF and a flag LCF indicative of possibility of focus detection are provided. The flag is set to LCF=1 when focus detection is impossible, and it is set to LCF=0 when focus detection is possible. In the step #600, the program proceeds to the step #610 in which AF display is given. More specifically, the in-focus/out-of-focus display is carried out, and if it is out of focus, the direction of defocus is displayed. If LCF=1, the program proceeds to the step #620, in which display of impossibility of AF is given. The program proceeds from the step #610 or #620 to the step #700 in which the lens is driven. More specifically, when it is out of focus, the lens is driven to an in-focus position based on the sign and magnitude of the defocus amount DF, and when it is in-focus, the driving of the lens is stopped. When focus detection is impossible, the lens is driven reciprocatedly to an end portion, in order to detect a lens position enabling focus detection.

Figure 11:
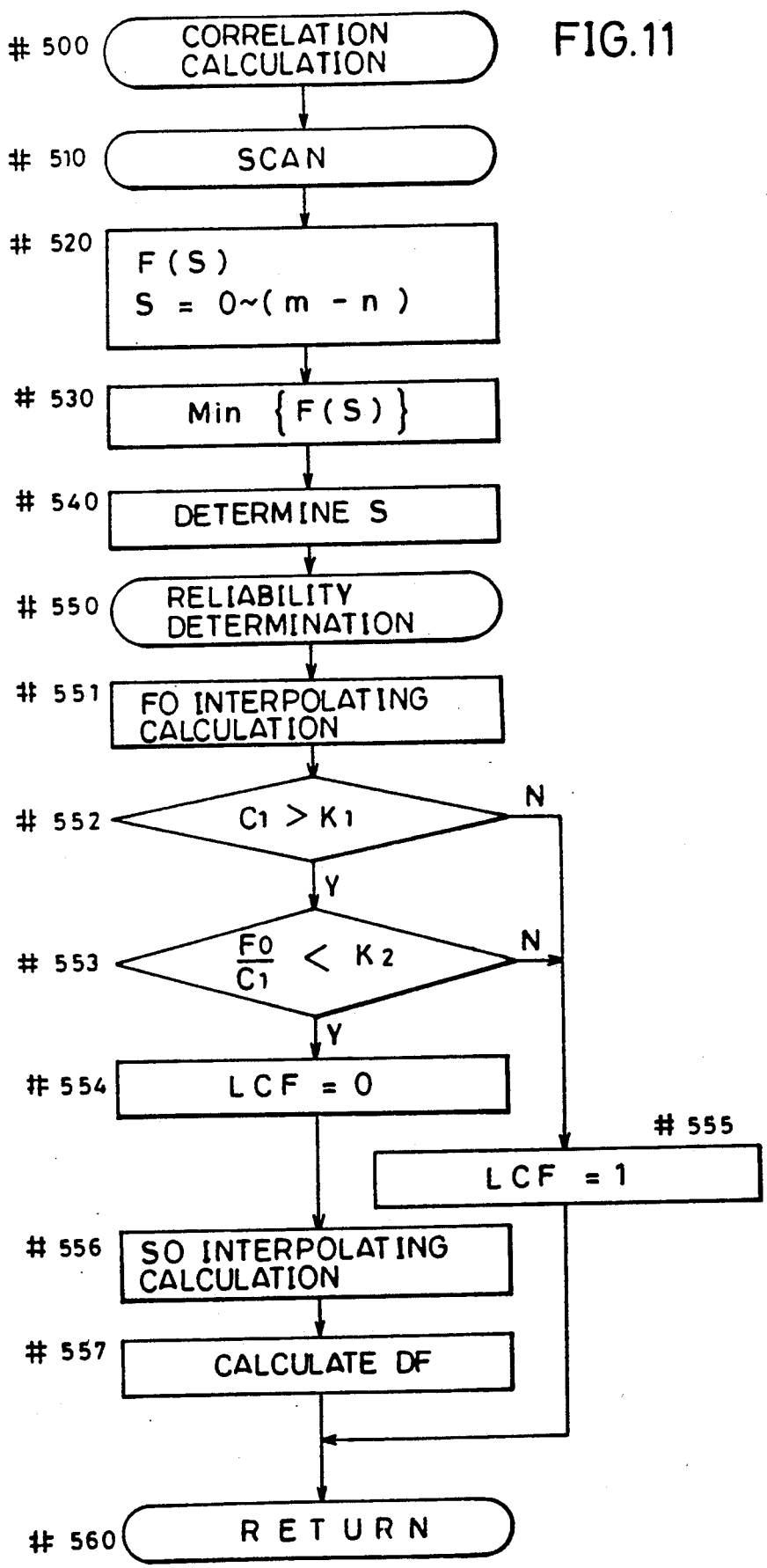
FIG. 11 is a flow chart showing specific contents of correlation calculation of FIG. 10.

FIG. 11 shows the subroutine of correlation calculation in the step #500. If this subroutine is called, in the step 510, the light intensity centers $G_{13}, G_{14}, G_{15}, \ldots, G_{1(n-2)}$ of the base portion are scanned in association with the light intensity centers $G_{23}, G_{24}, G_{25} \ldots, G_{2(m-2)}$ of the reference portion (that is, compared one pixel by one pixel), so as to determine the whole optical image of the base portion corresponds to which portion of the optical image of the reference portion. For this purpose, in the step #520, evaluation function F (s) is calculated for each of a plurality of scanning positions $s=0, 1, 2, \ldots, (m-n)$. The evaluation function F (s) is represented as the following equation.

$$F(s) = \sum_{i=3}^{n-2} |G_{1i} - G_{2(i+s)}|$$

For example, if s=0, the evaluation function F (0) indicates difference between the light intensity centers $G_{13}$ to $G_{1(n-2)}$ of the base portion and the light intensity centers $G_{23}$ to $G_{2(n-2)}$ of the reference portion. If $s=(m-n)$, the evaluation function F (m−n) indicates difference between the light intensity centers $G_{13}$ to $G_{1(n-2)}$ of the base portion and the light intensity centers $G_{2(m-n+3)}$ to $G_{2(n-2)}$ of the reference portion. Therefore, the smaller the value of evaluation function F(s), the higher becomes the correspondence between the light intensity centers $G_{13}$ to $G_{1(-2)}$ of the base portion and the light intensity centers $G_{2(3+S)}$ to $G_{2(n-2+s)}$ of the reference portion. When the value of the evaluation function F(s) become the smallest at a prescribed scanning position s, there is the highest correlation (coincidence) between the light intensity centers $G_{13}$ to $G_{1(n-2)}$ of the base portion and the light intensity center $G_{2(3+s)}$ to $G_{2(n-2+s)}$ of the reference portion at the scanning position s. In other words, the partial region at the scanning position s of the optical image of the reference portion corresponds to the whole optical image of the base portion. Therefore, in the step #530, the minimum value Min {F (s)} of the evaluation function F (s) is retrieved and in the step #540, the scanning position s at which the evaluation function F (s) becomes the smallest is determined.

In the steps following the step #550, whether or not the detected scanning position s is reliable is determined. At first, in the step #551, the true minimum value $F_0$ of the evaluation function F (s) is calculated by interpolation, based on the minimum value Min {F (s)} of the evaluation function F (s) and the values of the evaluation function F (s) preceding and succeeding the minimum value. Namely, since the scanning position s is integral data, the evaluation function F (s) are calculated as discrete values. However, if the scanning position s is data of real number, the evaluation function F (s) has continuous values. Therefore, the minimum value of the evaluation function F (s) in that case, is regarded as $F_0$. In the step #552, contrast $C_1$ is calculated in accordance with the following equation for all the pixel signals $D_{1i}$ of the basic portion, and determined whether or not the contrast $C_1$ is larger than a prescribed value $K_1$.

$$C_1 = \sum_{k=1}^{n-1} |D_{1k} - D_{1(k+1)}|$$

If $C_1 > K_1$ in the step #552, then if a value $(F_0/C_1)$ provided by dividing the true minimum value $F_0$ of the evaluation function F (s) calculated by interpolation by the contrast $C_1$ is smaller than a prescribed value $K_2$ or not is determined in #553. If $C_1 \leq K_1$ in the step #552 or if $(F_0/C_1) \geq K_2$ in the step #553, the program proceeds to the step #555 in which the flag LCF is set to 1. As described above, the flag LCF indicates, when LCF=1, that the result of focus detection is unreliable and when LCF=0, that the result of focus detection is reliable. If $C_1 > K_1$ in the step #552 and $(F_0/C_1) < K_2$ in the step #553, it means that the contrast of the optical image provided in the basic portion is sufficiently high, and the minimum value $F_0$ of the evaluation function F (s) is sufficiently small. Namely, the result of focus detection is reliable, so that the program proceeds to the step #554 in which the flag LCF is set to 0. In the step #556, the scanning position $s_0$ at which the evaluation function F (s) has the true minimum value $F_0$ is calculated as a real number data by interpolating calculation. In the step #557, the amount of defocus DF is calculated based on the scanning position $s_0$ provided by the interpolating calculation. The program proceeds from the step #557 or #555 to the step #560, and returned.

Modification 1

Figure 12:
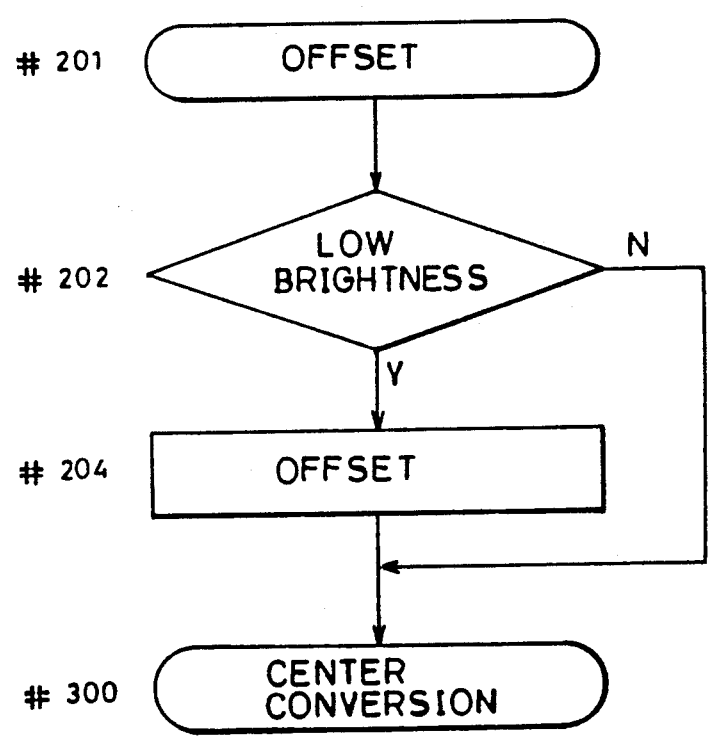
FIG. 12 is a flow chart showing contents of a first modification of one embodiment of the present invention.

In the above described embodiment, offset is given to the pixel signals $D_i$ as described with reference to FIGS. 5A, 5B, 6A and 6B, in order to prevent degradation of accuracy in calculating the light intensity center $G_i$. However, the accuracy in calculating the light intensity center $G_i$ is degraded only when the level of the pixel signal $D_i$ is low. Therefore, if the level of the pixel signal $D_i$ is sufficiently high, the accuracy in calculating the light intensity center $G_i$ is sufficiently high, even if the offset is not applied to the pixel signal $D_i$. Rather, the resolution of the light intensity center $G_i$ is reduced when the difference M between the maximum value MX and the minimum value MN exceeds 128, since the level of the pixel signal $D_i$ is made ½ at the time of applying offset. For example, if the maximum value MX of the pixel signal $D_i$ is 250 and the minimum value MN is 100, and an offset is applied, the maximum value MX become $250/2+(128-100/2)=203$, and the minimum value MN becomes 128, which reduces contrast and decrease the resolution of the light intensity center $G_i$. Therefore, as shown in FIG. 12, in the process of the offset determination in the step #201, whether or not the level of the pixel signal $D_i$ is low is determined in the step #202, and if the level of the pixel signal $D_i$ is low, offset is given in the step #204. If the level of the pixel signal $D_i$ is high, the step #204 is skipped, and no offset is applied. By doing so, offset can be applied only when the brightness is low and the influence of the dark noise is large, and offset is not applied when the brightness is high and the influence of dark noise is small. Accordingly, light intensity center with high precision can be calculated in either case. In addition, when the brightness is high, the process of applying offset is omitted, so that the speed of operation when the brightness is high can be improved.

Modification 2

Figure 13:
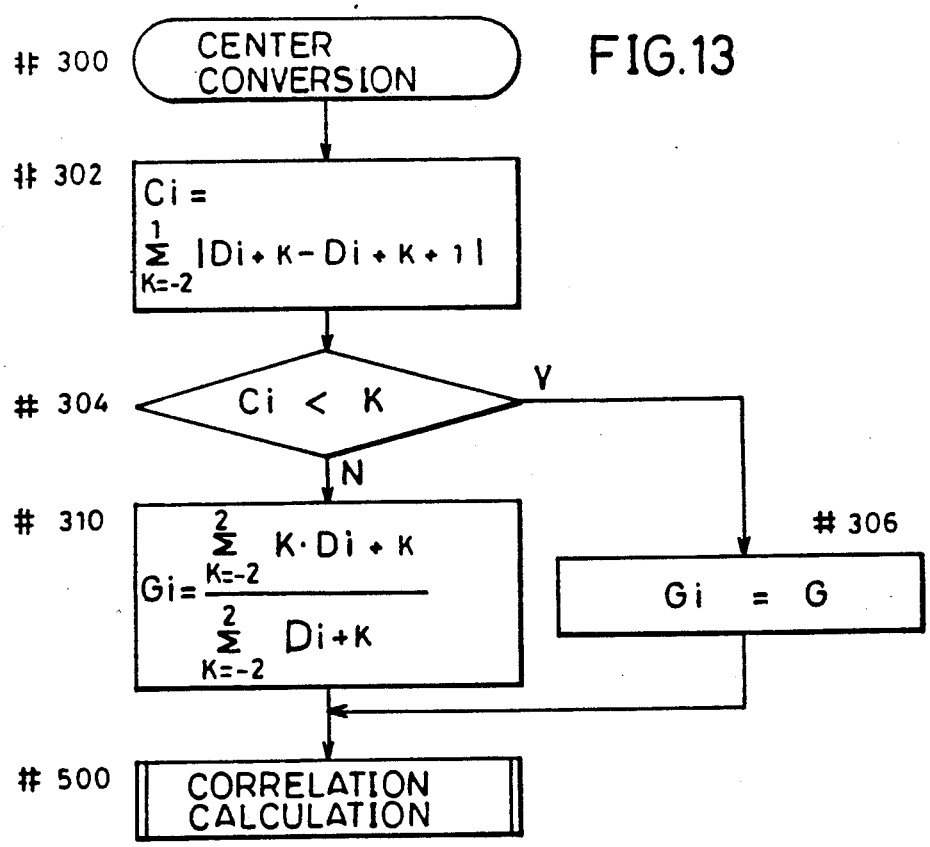
FIG. 13 is a flow chart showing contents of a second modification of one embodiment of the present invention.

In the above described embodiment and in the modification 1, offset is applied to the pixel signal $D_i$ in order to remove influence of the dark noise when the level of the pixel signal $D_i$ is low. An algorithm as shown in FIG. 13 may be used as another method. In accordance with this algorithm, contrast $C_i$ of five adjacent pixel signals $D_{i-2}, D_{i-1}, D_i, D_{i+1}$ and $D_{i+2}$ used for calculating the light intensity center $G_i$ is calculated, and if the contrast $C_i$ is smaller than the prescribed value K, the light intensity center $G_i$ is set to a constant value G (for example, G=0). The contrast $C_i$ of the adjacent five pixel signals $D_{i-2}, D_{i-1}, D_i, D_{i+1}$, and $D_{i+2}$ can be calculated in accordance with the following equation.

$$C_i = \sum_{k=-2}^{i} |D_{i+k} - D_{i+k+1}|$$

In the step #302, the contrast $C_i$ of the adjacent five pixel signals $D_{1-2}, D_{i-1}, D_i, D_{i+1}$ and $D_{i+2}$ is calculated in accordance with the above equation, and in the step #304, whether or not $C_i<K$ is determined. If $C_i<K$, then the light intensity center is set as $G_i=G(=0)$ in the step #306. If $C_i>K$, the light intensity center $G_i$ is calculated in accordance with the equation (*) in the step #310. Since the dark noise has low level, the contrast $C_i$ becomes smaller than the prescribed value K where pixel signals caused by the dark noise are continued, so that the program proceeds from the step #304 to #306, in which the light intensity center $G_i$ is set to be a constant value G(=0). By doing so, improper calculation of the light intensity center $G_i$ derived from the dark noise can be prevented.

Modification 3

Figure 14:
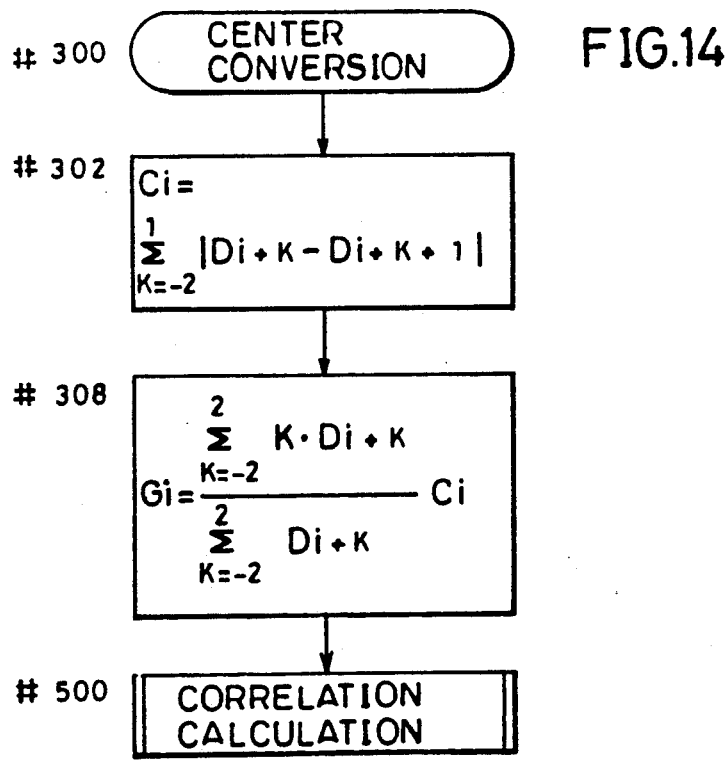
FIG. 14 is a flow chart showing contents of a third modification of one embodiment of the present invention.

In accordance with another method, the contrast $C_i$ of the adjacent five pixel signals $D_{i-2}, D_{i-1}, D_i, D_{i+1}$, and $D_{i+2}$ is calculated, and the contrast is multiplied by the light intensity center $G_i$ calculated in accordance with the above equation (*), so that a light intensity center $G_i$ weighted by the contrast $C_i$ is provided. The algorithm is shown in FIG. 14. Referring to the figure, the contrast $C_i$ is calculated in the step #302, the light intensity center $G_i$ weighted by the contrast $C_i$ is calculated in the step #308 and the program proceeds to the correlation calculation of the step #500. In accordance with this method, the light intensity center $G_i$ is evaluated to be small where the contrast $C_i$ is low, while the light intensity center $G_i$ is evaluated larger where the contrast $C_i$ is high. Therefore, at portions where pixel signals caused by the dark noise are continued, the light intensity center $G_i$ becomes smaller as the contrast $C_i$ is low, whereby improper calculation of the light intensity center $G_i$ due to the dark noise can be prevented. At portions where effective pixel signals are continued, the light intensity center $G_i$ becomes larger as the contrast $C_i$ is high, so that effective light intensity center $G_i$ can be calculated.

Modification 4

The numerator of the above described equation (*) for calculating the light intensity center $G_i$, that is, primary moment $M_i$ of the light intensity distribution may be used instead of the light intensity center $G_i$ to obtain the same effect. The primary moment $M_i$ of the light intensity distribution can be provided by the following equation.

$$M_i = \{-2 \times D_{i-2} - 1 \times D_{i-1} + 0 \times D_{i+1} \times D_{i+1} + 2 \times D_{i+2}\}$$

As is apparent from the above equation, absolute value of the primary moment $M_i$ of the light intensity distribution becomes smaller where pixel signals caused by the dark noise are continued, and it becomes larger where effective pixel signals are continued. Therefore, the same effect as described in the modification 3 can be provided.

Modification 5

Figure 15A:
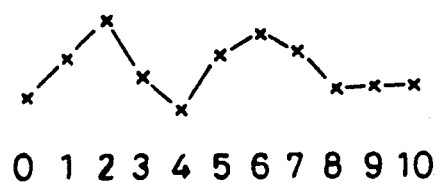
FIG. 15A shows distribution of pixel signal levels in a fifth modification of one embodiment of the present invention.
Figure 15B:
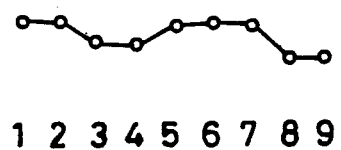
FIG. 15B shows distribution of rows of pixels provided by prescribed processing of the pixel signals shown in FIG. 15A.

The influence of the dark noise can be reduced in accordance with a still further method, in which where the pixel signal $D_i$ is smaller than a prescribed value, an intermediate value (that is, not the maximum value nor the minimum value) out of three adjacent values is used as the value of the pixel at the center of the adjacent three pixels, which operation is successively carried out pixel by pixel, starting from the heading three pixels. FIGS. 15A and 15B illustrate this method (in these figures, the pixel signal $D_i$ is simply represented by i). FIG. 15A shows fluctuation of the pixel signals $D_0$ to $D_{10}$ by the influence of the dark noise, and when the levels of the pixel signals $D_i$ are low. In order to reduce the influence of the dark noise, the intermediate value $D_i$ which is not the maximum value $D_2$ nor the minimum value $D_0$ out of the heading three pixels $D_0$ to $D_2$ is used as the pixel value of the center pixel $D_1$. Thereafter, the intermediate value $D_1$ which is not the maximum value $D_2$ nor the minimum value $D_3$ out of the three pixels $D_1$ to $D_3$ shifted by one pixel from the head is used as the pixel value of the central pixel $D_2$. Thereafter, the intermediate value $D_1$ which is not the maximum value $D_2$ nor the minimum value $D_4$ out of the three pixels $D_2$ to $D_4$ provided by shifting two pixels from the head is used as the pixel value of the central pixel $D_3$. Then, the intermediate value $D_3$ which is not the maximum value $D_5$ nor the minimum value $D_4$ out of the three pixels $D_3$ to $D_5$ provided by shifting three pixels from the head is used as the pixel value of the central pixel $D_4$. In the same manner, an intermediate value not the maximum value nor the minimum value out of the three pixels $D_i$, $D_{i+1}$ and $D_{i+2}$ provided by shifting i pixels from the head is used as the pixel value of the central pixel $D_{i+1}$, and by repeating this process, a series of pixels $D_1$ to $D_9$ shorter than the series of pixels $D_0$ to $D_{10}$ by 2 pixels is provided as shown in FIG. 15B, and the influence of the dark noise can be significantly reduced.

Modification 6

Figure 16:
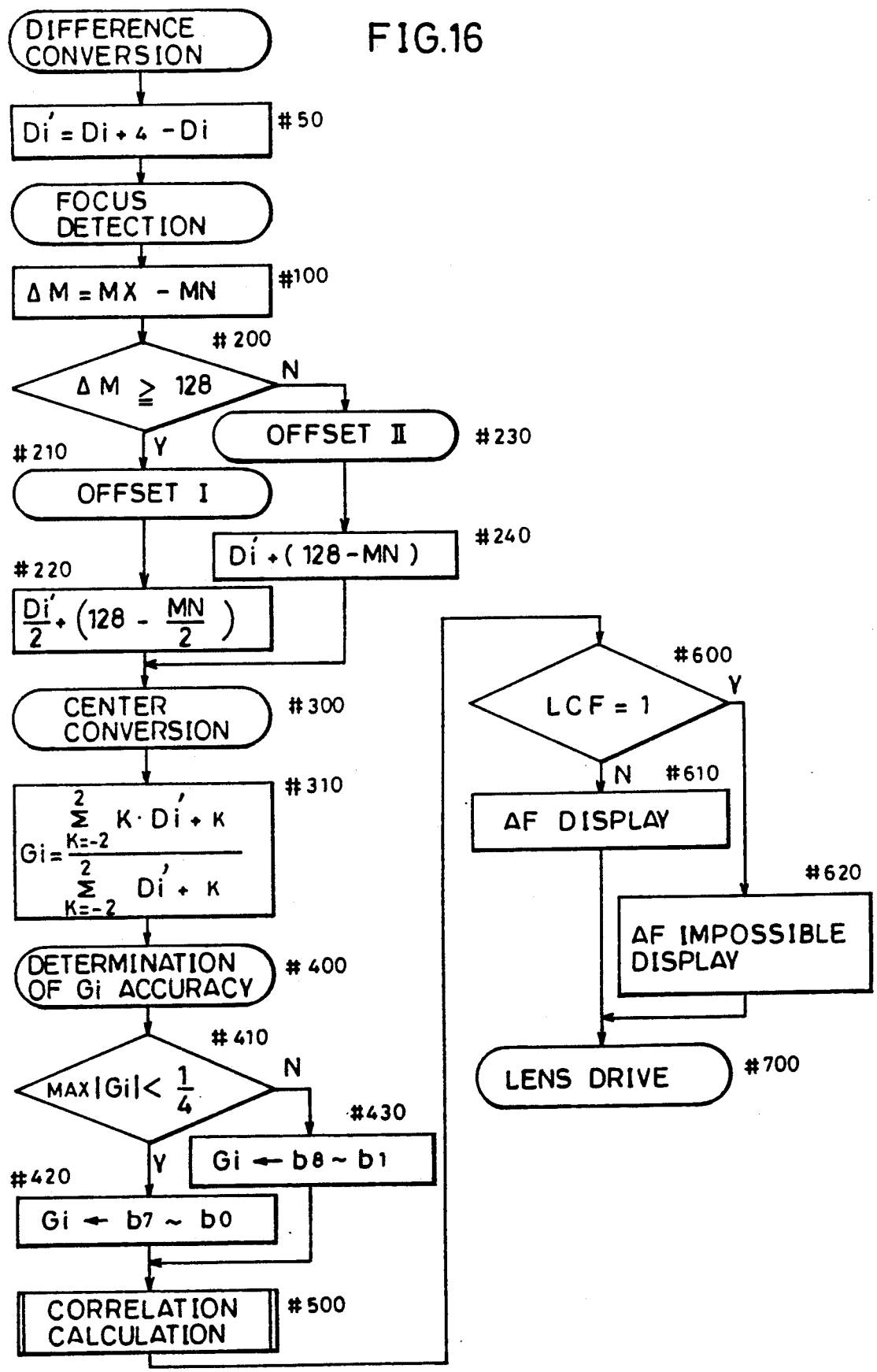
FIG. 16 is a flow chart showing contents of a sixth modification of one embodiment of the present invention.

Although the light intensity itself is used in the above embodiment and above modifications as the functional value based on the light intensity, the contrast value of the light intensity may be used. FIG. 16 shows an example in which a difference (contrast value) of pixel signal and $D_{i+4}$ and $D_i$ adjacent to each other with three pixels posed therebetween is used as a functional value based on the light intensity. In this example, the following differential conversion is carried out to calculate the contrast value in the step #50.

$$D_i' = D_{i+4} - D_i$$

The number of data of the contrast value $D_i'$, calculated in accordance with the above equation is smaller than the number of data of the pixel signal $D_i$ by 4. In the example of FIG. 16, the contrast value $D_i'$ used instead of the pixel signal $D_i$ of FIG. 10, so that he number of data of the center $G_i$ based on the contrast value $D_i'$, is smaller by 4 than that of FIG. 10.

Modification 7

Figure 1:
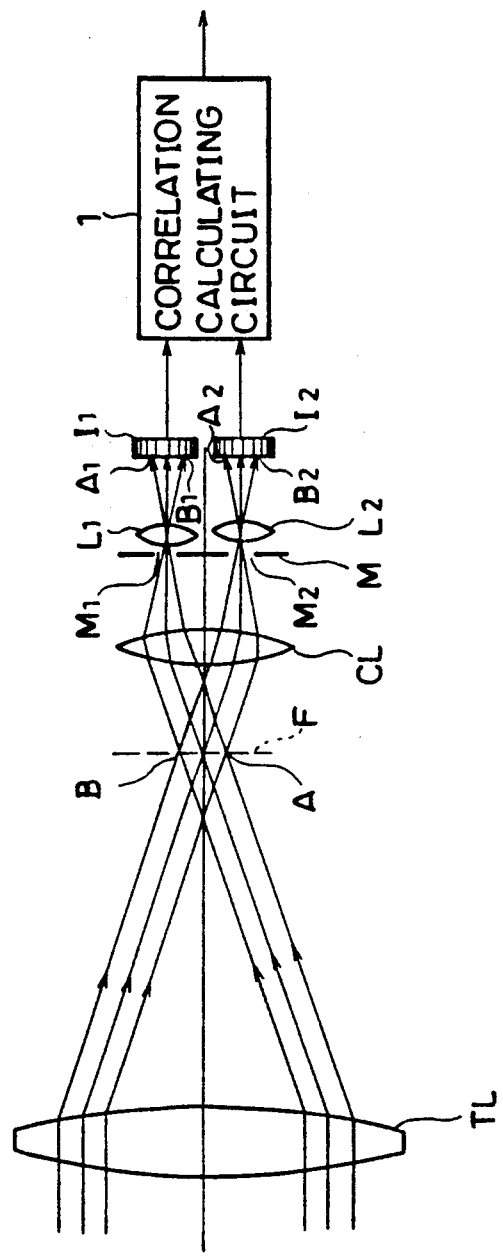
FIG. 1 is a schematic diagram of a focus detecting apparatus using TTL phase difference detecting method.
Figure 17:
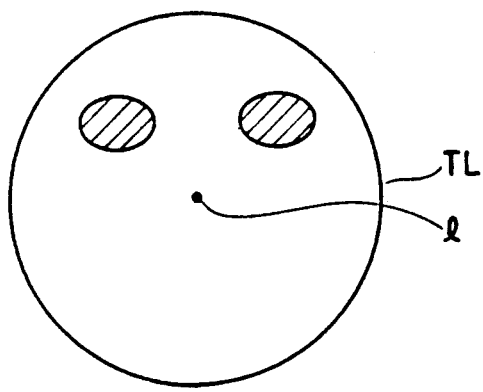
FIG. 17 shows arrangement of luminous bundles from an object in accordance with a seventh modification of one embodiment of the present invention.

In the optical system for focus detection, luminous bundles from the object for forming the first and second images are adapted to pass the first and second portions of a taking lens. The first and second portions do not necessarily sandwich the optical axis $l_0$ of the taking lens TL. For example, as shown by the hatched portions of FIG. 17, the first and second portions may be set not sandwiching the optical axis $l_0$ of the taking lens. In the example shown in the figure, a perpendicular bisector of the first and second portions exist on the optical axis $l_0$. When viewed from the direction of the vertical bisector, the optical system has the same structure as that of the optical system for focus detection shown in FIGS. 1 and 2.

Modification 8

Figure 18:
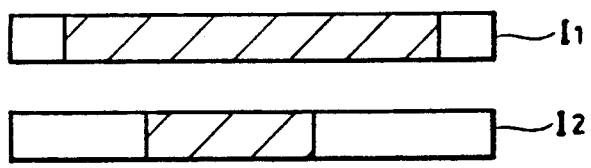
FIG. 18 shows a range of comparison of centers in accordance with an eighth modification of one embodiment of the present invention.

In each of the above described modification, the light intensity center taken in the full range as the image sensor $I_1$ of the basic portion are compared with the light intensity centers taken in the full range of the image sensor $I_2$ as the reference portion. However, as shown in FIG. 18, light intensity centers taken in the range represented by the hatched portion of the image sensor $I_1$ may be compared with the light intensity centers taken in the range represented by the hatched portion of the image sensor $I_2$.

In the present invention, in a focus detecting apparatus adapted to detect state of focusing of a taking lens by detecting a space between first and second images formed by luminous bundles from an object passing through the first and second portions of the taking lens, correlation calculation is carried out on representative values based on the first light intensity calculated for each of a plurality of portions of a series of elements in a first series of photosensitive elements receiving the first image and representative values based on the second light intensity calculated for each of a plurality of portions of a series of elements in a second series of photosensitive elements receiving the second image, and the space between the first and second images are detected under the condition that the correlation is the highest, so that even if the brightness distribution of the first and second images are asymmetrical due to errors during manufacturing or assembling the optical system for focus detection, the space between the two images can be accurately evaluated. Therefore, in the focus detecting apparatus of the present invention, even if the optical system for forming the first and second images is asymmetrical, the influence thereof on the error in focus detection can be made smaller.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus detecting apparatus for detecting the focusing state of a taking lens by detecting relative positional relation between first and second images formed by luminous bundles from an object passed through first and second portions of a taking lens and passing through first and second image reforming lenses, comprising:

first series of photosensitive elements receiving the first image;

second series of photosensitive elements receiving the second image;

first calculating means related to a plurality of portions of the series of elements each comprising a prescribed number of elements on said first series of photosensitive elements, for calculating a center value of light intensity distribution for each of the portions of the series of elements;

second calculating means related to a plurality of portions of the series of elements each comprising a prescribed number of elements on said second series of photosensitive elements, for calculating a center value of light intensity distribution for each of the portions of the series of elements;

correlation calculating means for dividing the portions of the series of elements on the second series of photosensitive elements into a plurality of groups having the same number of portions of the series of elements as that of the portions of the series of elements on the first series of photosensitive elements and for calculating correlation between the center values of each group and the center values of the portions of the series of elements on the first series of photosensitive elements;

specifying means for specifying a group having the highest correlation calculated by said correlation calculating means; and detecting means for detecting relative positional relation between the portions of the series of elements on said first series of photosensitive elements and the group specified by said specifying means.

2. A focus detecting apparatus according to claim 1, wherein the center value of light intensity distribution is provided by dividing a sum of products of a distance from a central portion of a portion of the series of elements to each of the elements constituting that portion of the series of elements and the light intensity on each element by total sum of the light intensity of each of the elements.

3. A focus detecting apparatus according to claim 1, wherein said first and second calculating means comprise biasing means for adding a prescribed offset value to the light intensity of each element on the portions of the series of elements.

4. A focus detecting apparatus according to claim 1, wherein
said first and second calculating means comprise
contrast information calculating means for calculating contrast information of light intensity of each of the portions of the series of elements, and
means for setting a constant value as a center value of light intensity distribution for a portion of the series of elements where the contrast is smaller than a prescribed value 5. A focus detecting apparatus according to claim 1, wherein
said first and second calculating means comprise
contrast information calculating means for calculating contrast information of light intensity of each of the portions of the series of elements, and means for multiplying the center value of light intensity distribution for each of the portions of the series of elements by the contrast information of said portion of the series of elements as weight coefficient.

6. A focus detecting apparatus for detecting the focusing state of a taking lens by detecting relative positional relation between first and second images formed by luminous bundles from an object passed through first and second portions of a taking lens and passing through first and second image re-forming lenses, comprising:
first series of photosensitive elements receiving the first image;
second series of photosensitive elements receiving the second image;
first calculating means related to a plurality of portions of the series of elements each comprising a prescribed number of elements on said first series of photosensitive elements, for calculating a center value of light intensity distribution for each of the portions of the series of elements;
second calculating means related to a plurality of portions of the series of elements each comprising a prescribed number of elements on said second series of photosensitive elements, for calculating a center value of light intensity distribution for each of the portions of the series of elements;
correlation calculating means for dividing the portions of the series of elements on the second series of photosensitive elements into a plurality of groups having the same number of portions of the series of elements as that of the portions of the series of elements on the first series of photosensitive elements and for calculating correlation between the center values of each group and the center values of the portions of the series of elements on the first series of photosensitive elements;
specifying means for specifying a group having the highest correlation calculated by said correlation calculating means; and
detecting means for detecting relative positional relation between the portions of the series of elements on said first series of photosensitive elements and the group specified by said specifying means;

wherein said first and second calculating means use a primary moment of light intensity distribution of each of the portions of the series of more than three elements, instead of the center value of light intensity distribution for each of the portions of the series of elements.

7. A focus detecting apparatus according to claim 1, wherein
said first and second calculating means comprise
means for determining whether or not the light intensity is smaller than a prescribed value for each of the portions of the series of elements, and light intensity averaging means for selecting an intermediate value which is neither the maximum value nor the minimum value out of light intensities of adjacent three elements as the light intensity of the central element of said three elements.

8. A focus detecting apparatus according to claim 1, wherein
said first and second calculating means comprise
means for determining whether all the center values are in a prescribed range, and
resolution setting means for setting resolution of each of the center values high when all the center values are in the prescribed range, and for setting low the resolution of each center value, when any of the center values goes out of the range.

9. A focus detecting apparatus according to claim 3, wherein
said first and second calculating means further comprise means for determining light intensity level received by the series of photosensitive elements based on a prescribed light intensity value, and when the light intensity level is low, adds an offset value by said biasing means, and when the light intensity level is high, prohibit the operation of said biasing means.

10. A focus detecting apparatus according to claim 1, wherein
said first and second calculating means calculate the center values of the portions of the series of elements by using, instead of the light intensity received by the portions of the series of elements, the contrast value of the light intensity.

11. A focus detecting apparatus for detecting focus condition of a taking lens, comprising:
first unit of photosensitive elements receiving light flux from an object passed through a first portion of the taking lens;
second unit of photosensitive elements receiving light flux from the object passed through a second portion of the taking lens;
first calculating means related to a plurality of groups of elements each comprising a prescribed number of elements on said first unit of photosensitive elements, for calculating a center value of light intensity distribution for each group of elements;
second calculating means related to a plurality of groups of elements each comprising a prescribed number of elements on said second unit of photosensitive elements, for calculating a center value of light intensity distribution for each group of elements;
correlation calculating means for dividing the groups of elements on the second unit of photosensitive elements into a plurality of sub-groups having the same number of groups of elements as that of the groups of elements on the first unit of photosensitive elements and for calculating correlation between the center values of each sub-groups and the center values of the groups of elements on the first unit of photosensitive elements;

specifying means for specifying a sub-group having the highest correlation calculated by said correlation calculating means; and detecting means for detecting the focus condition of the taking lend in accordance with the result of said specifying means.

12. A focus detecting apparatus according to claim 11, wherein the center value of light intensity distribution provided by dividing a sum of products of a distance from a central portion of a group of elements to each of the elements constituting that group of elements and the light intensity on each elements by total sum of the light intensity of each of the elements.

13. A focus detecting apparatus for detecting the focusing state of a taking lens by detecting a relative positional relation between first and second images formed by luminous bundles from an object passed through first and second portions of a taking lens and passing through first and second image re-forming lenses, comprising:

first series of photosensitive elements receiving the first image;

second series of photosensitive elements receiving the second image;

first calculating means related to a plurality of portions of the series of elements each comprising a prescribed number of elements on said first series of photosensitive elements, for calculating a value obtained by dividing a light intensity moment value of the portion of the series of elements by a sum of received light intensity of the portion of the series of elements for each of the portions of the series of elements;

second calculating means related to a plurality of portions of the series of elements each comprising a prescribed number of elements on said second series of photosensitive elements, for calculating a value obtained by dividing a light intensity moment value of the portion of the series of elements by a sum of received light intensity of the portion of the series of elements for each of the portions of the series of elements;

correlation calculating means for dividing the portions of the series of elements on the second series of photosensitive elements into a plurality of groups having the same number of portions of the series of elements as that of the portions of the series of elements on the first series of photosensitive elements and for calculating correlation between the values of each group and the values of the portions of the series of elements on the first series of photosensitive elements;

specifying means for specifying a group having the highest correlation calculated by said correlation calculating means; and detecting means for detecting relative the positional relation between the portions of the series of elements on said first series of photosensitive elements and the group specified by said specifying means.

14. A focus detecting apparatus for detecting the focus condition of a taking lens, comprising:

first unit of photosensitive elements receiving light flux from an object passed through a first portion of the taking lens;

second unit of photosensitive elements receiving light flux from the object passed through a second portion of the taking lens;

first calculating means related to a plurality of groups of elements each comprising a prescribed number of elements on said first unit of photosensitive elements, for calculating a value obtained by dividing a light intensity moment value of the group of elements by a sum of received light intensity of the group of elements for each group of elements;

second calculating means related to a plurality of groups of elements each comprising a prescribed number of elements on said second unit of photosensitive elements, for calculating a value obtained by dividing a light intensity moment value of the group of elements by a sum of received light intensity of the group of elements for each group of elements;

correlation calculating means for dividing the groups of elements on the second unit of photosensitive elements into a plurality of sub-groups having the same number of groups of elements as that of the groups of elements on the first unit of photosensitive elements and for calculating correlation between the values of each sub-groups and the values of the groups of elements on the first unit of photosensitive elements;

specifying means for specifying a sub-group having the highest correlation calculated by said correlation calculating means; and detecting means for detecting the focus condition of the taking lens in accordance with the result of said specifying means.

15. A correlation calculating apparatus for calculating correlation between first and second images formed by luminous bundles from an object, comprising:

first receiving means, comprising a plurality of photosensitive elements, for receiving the first image;

second receiving means, comprising a plurality of element groups each of which consists of a plurality of photosensitive elements, for receiving the second image;

first calculating means for calculating center values of light intensity distribution for each element group of the first receiving means;

second calculating means for calculating center values of light intensity distribution for each element group of the second receiving means;

third calculating means for calculating the correlation between the first image and the second image on the basis of the plurality of center values calculated by the first and second calculating means.

16. A correlation calculating apparatus for calculating correlation between first and second images formed by luminous bundles from an object, comprising:

first receiving means, comprising a plurality of element groups each of which consists of more than three photosensitive elements, for receiving the first image;

second receiving means, comprising a plurality of element groups each of which consists of more than three photosensitive elements, for receiving the second image;

first calculating means for calculating primary moments of light intensity distribution for each element group of the first receiving means;

second calculating means for calculating primary moments of light intensity distribution for each element group of the second receiving means; and third calculating means for calculating the correlation between the first image and the second image on the basis of the plurality of primary moments calculated by the first and second calculating means.

* * * * *